United States Patent
Narayan et al.

(10) Patent No.: US 11,682,768 B2
(45) Date of Patent: Jun. 20, 2023

(54) LOW-COST SURFACE-PROTECTED IRON-BASED SUBSTRATES FOR THE NICKEL HYDROXIDE ELECTRODE IN ALKALINE BATTERIES

(71) Applicant: UNIVERSITY OF SOUTHERN CALIFORNIA, Los Angeles, CA (US)

(72) Inventors: Sri Narayan, Arcadia, CA (US); Debanjan Mitra, Los Angeles, CA (US); Phong Thanh Trinh, Broomfield, CO (US); Ahamed Irshad Maniyanganam, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 30 days.

(21) Appl. No.: 17/522,296

(22) Filed: Nov. 9, 2021

(65) Prior Publication Data
US 2022/0149381 A1    May 12, 2022

Related U.S. Application Data

(60) Provisional application No. 63/111,535, filed on Nov. 9, 2020.

(51) Int. Cl.
| | | |
|---|---|---|
| *H01M 4/62* | (2006.01) | |
| *H01M 10/30* | (2006.01) | |
| *H01M 4/32* | (2006.01) | |
| *H01M 4/74* | (2006.01) | |
| *H01M 4/52* | (2010.01) | |
| *H01M 4/66* | (2006.01) | |

(52) U.S. Cl.
CPC ............ *H01M 4/628* (2013.01); *H01M 4/32* (2013.01); *H01M 4/52* (2013.01); *H01M 4/669* (2013.01); *H01M 4/747* (2013.01); *H01M 10/30* (2013.01); *H01M 2300/0014* (2013.01)

(58) Field of Classification Search
CPC .......... H01M 4/628; H01M 4/32; H01M 4/52; H01M 4/669; H01M 4/747; H01M 10/30; H01M 2300/0014; H01M 4/667; Y02E 60/10
See application file for complete search history.

(56) References Cited

FOREIGN PATENT DOCUMENTS

| KP | 1990-0007006 | * | 5/1990 | ............... H01F 1/06 |
|---|---|---|---|---|
| WO | WO2018/009930 | * | 1/2018 | ............... H01M 4/90 |

* cited by examiner

*Primary Examiner* — Helen Oi K Conley
(74) *Attorney, Agent, or Firm* — Brooks Kushman P.C.

(57) ABSTRACT

An electrode for a battery includes an iron-containing substrate and a cobalt ferrite layer disposed over the iron-containing substrate. Advantageously, the cobalt ferrite layer inhibits corrosion of the iron-containing substrate. A nickel hydroxide layer is disposed over the cobalt ferrite layer. A battery incorporating the electrode is also provided.

26 Claims, 13 Drawing Sheets

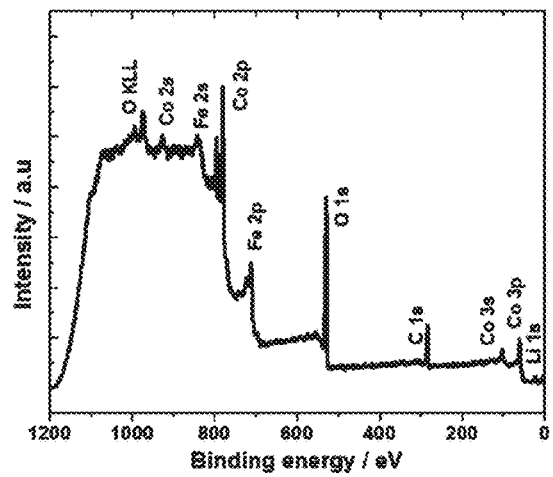
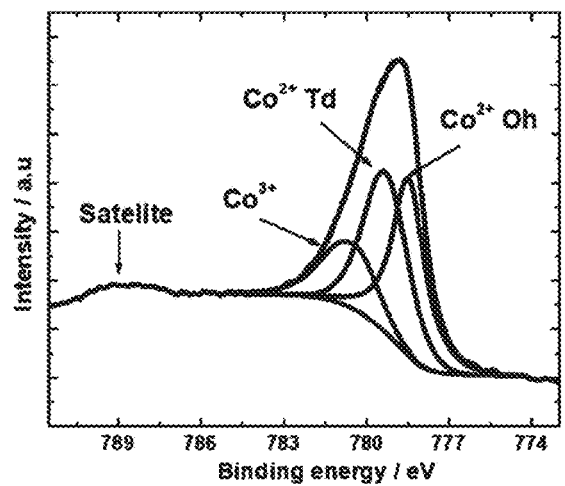
Fig. 5A
Fig. 5B
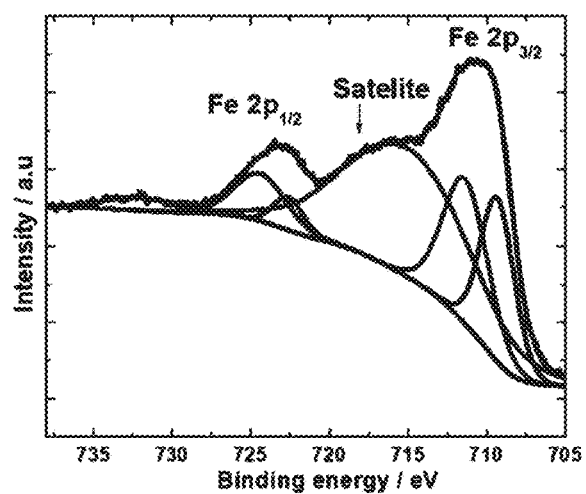
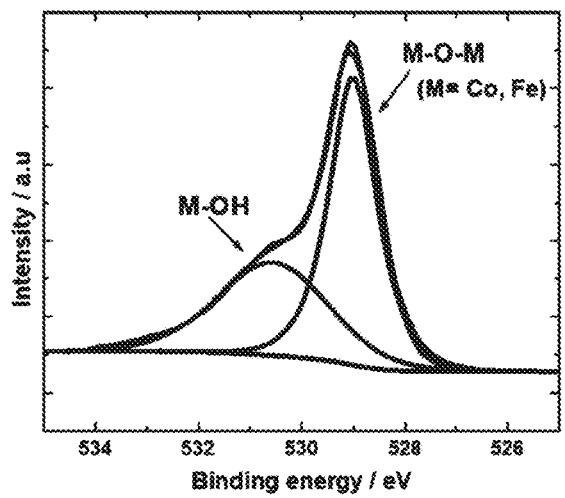
Fig. 5C
Fig. 5D

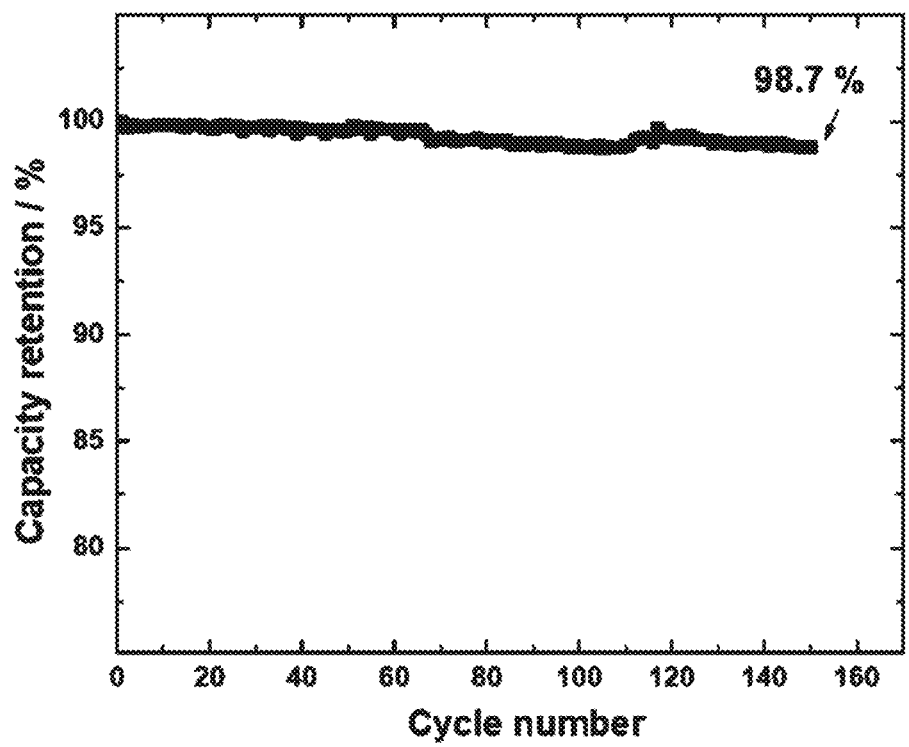
*Fig. 11A*
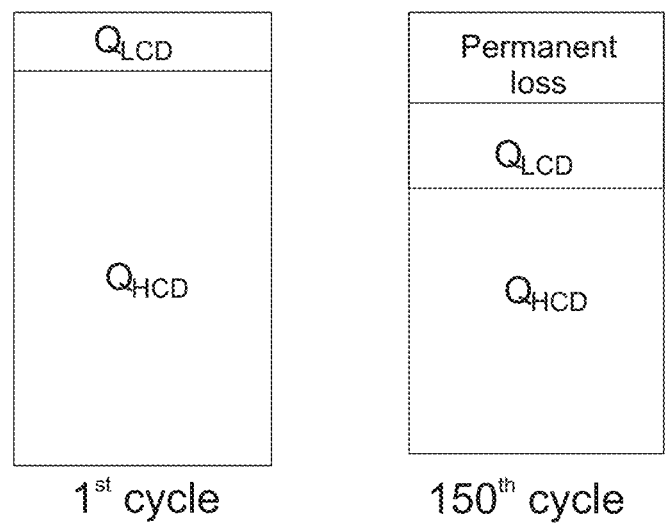
*Fig. 11B-1*   *Fig. 11B-2*

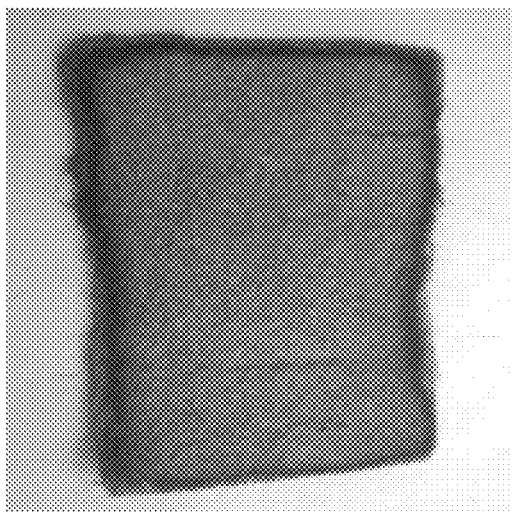 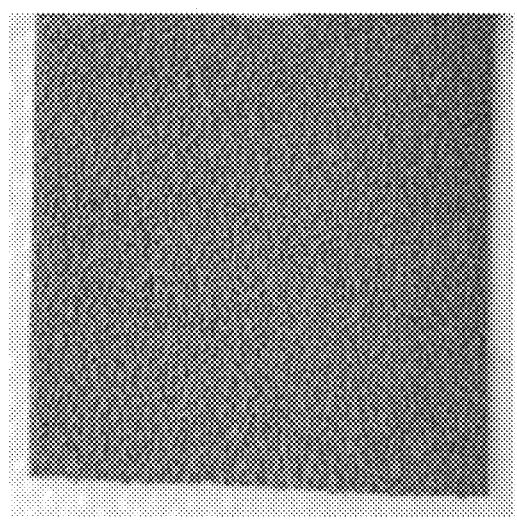
Fig. 12A      Fig. 12B
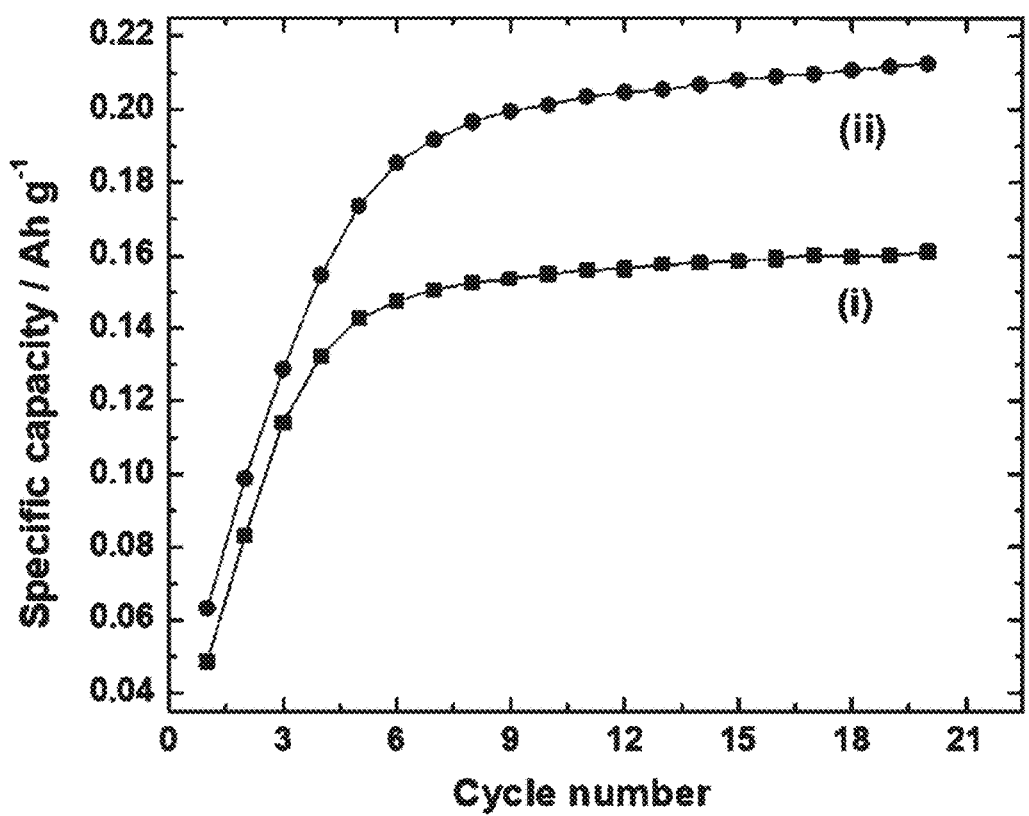
Fig. 12C

LOW-COST SURFACE-PROTECTED IRON-BASED SUBSTRATES FOR THE NICKEL HYDROXIDE ELECTRODE IN ALKALINE BATTERIES

CROSS-REFERENCE TO RELATED APPLICATIONS

This application claims the benefit of U.S. provisional application Ser. No. 63/111,535 filed Nov. 9, 2020, the disclosure of which is hereby incorporated in its entirety by reference herein.

TECHNICAL FIELD

In at least one aspect, the present invention is related to improvements for alkaline batteries.

BACKGROUND

The nickel hydroxide electrode is the positive electrode in many rechargeable alkaline batteries[1] such as nickel-iron, nickel-cadmium, nickel-metal hydride, nickel-hydrogen and nickel-zinc batteries. A typical nickel hydroxide electrode comprises of an electrochemically-active phase, β-nickel (II) hydroxide, supported on an electrically-conducting substrate made of nickel foam or a porous sintered nickel structure. This active material is repeatedly oxidized and reduced during charge and discharge of the battery. To improve electrode performance several additives such as cobalt oxides/hydroxides, compounds of calcium or zinc, carbon, etc. are usually added to the active material.[2] The electrode substrate serves as the current collector and mechanical support, and does not contribute to the capacity of the nickel hydroxide electrode. Thus, the primary requirements of such a substrate are high electrical conductivity, mechanical robustness, and chemical/electrochemical stability at the positive electrode potentials of the nickel hydroxide electrode.

Two types of current-collector substrates based on nickel metal have served well for the nickel hydroxide electrode. A porous nickel substrate formed by sintering of nickel powder is noted for providing mechanical robustness to repeated charge/discharge cycling.[3] However, the sintering process is expensive and the active material loading in these electrodes is limited.[4] In the last four decades, pasted-type electrodes with a porous nickel foam substrate have been used predominantly in commercial batteries, especially in the nickel-metal hydride batteries for hybrid electric vehicles. The nickel foam electrodes are less expensive than the sintered electrodes and hold a greater quantity of active material. In both these types of substrates, the inherent chemical stability of nickel in concentrated alkali and high electrical conductivity of the structure have been important criteria.[5] Nickel is an expensive metal, about 40 times the price of iron. However, according to the Pourbaix diagram, iron is oxidized readily to a soluble ferrate ion at the operating potential of the nickel hydroxide electrode at pH 14 or greater.[6] Thus, for an iron substrate to be viable it must be: (1) protected against anodic dissolution in strongly alkaline solutions and (2) the surface must be electrically conducting to connect up electrically with the active material. Electroplating and electroless plating of nickel have been used to protect iron. The pre- and post-treatment steps, thickness of coating of several micrometers of nickel to avoid pin holes, and the cost of electroplating add to the final cost of the substrate.[7,8] Recently, we have reported an iron electrode modified with a thermal coating of nickel hydroxide as a highly active and durable oxygen evolution reaction (OER) catalyst in alkaline electrolyzer.[9] Inspired by the extreme robustness and cost-effectiveness of this electrode, we intended to evaluate the usefulness of similar coatings as a protective layers for the iron substrate in alkaline batteries. The prerequisite, however, is that the substrate should not contribute significantly to OER during battery charging. Consequently, we selected a cobalt oxide based coating over a nickel oxide coating for the battery.[10]

SUMMARY

In at least one aspect, a highly robust nanostructured thin film of cobalt ferrite produced by a thermal coating process specifically for the battery electrode substrate is provided. The durability of this cobalt ferrite protected steel substrate is demonstrated and the properties of the coating that give rise to the protection and the electrical conductivity are investigated. Doping of the coating with lithium ions is found to specifically enhance the electrical conductivity. Advantageously, the performance of the substrate when used as nickel hydroxide battery electrode is comparable to that of the relatively expensive nickel electrodes.

In another aspect, an electrode for a battery is provided. The electrode includes an iron-containing substrate and a cobalt ferrite layer disposed over the iron-containing substrate. Advantageously, the cobalt ferrite layer inhibits corrosion of the iron-containing substrate. A nickel hydroxide layer is disposed over the cobalt ferrite layer.

In another aspect, an alkaline battery incorporating the protected electrodes set forth herein is provided. The alkaline battery includes a negative electrode and a positive electrode. The positive electrode includes an iron-containing substrate and a cobalt ferrite layer disposed over the iron-containing substrate. The cobalt ferrite layer inhibits corrosion of the iron-containing substrate. A nickel hydroxide layer is disposed over the cobalt ferrite layer. An electrolyte contacting the positive electrode and the negative electrode.

In another aspect, the use of three-dimensional porous nickel foam as the current collector of the nickel hydroxide electrode adds significantly to the cost of the nickel-based alkaline rechargeable batteries. Although iron is considerably less expensive, iron corrodes at the operating potential of the nickel hydroxide electrode. We have found that a 70-100 nm thick thermal coating of cobalt ferrite spinel protects the iron from corrosion. Such a coated iron substrate was found to be stable against corrosion even when polarized anodically at 10 mA cm$^{3+}$ in 30% potassium hydroxide electrolyte for 1000 hours. While the thermal coating of cobalt ferrite protected iron against corrosion, incorporation of lithium ions into the coating was found to enhance the electrical conductivity of the coating significantly by the formation of cobalt(III). XPS and EXAFS studies confirmed that the enhanced conductivity resulted from an increase in the population of $Co^{3+}$ in the ferrite spinel lattice. An inexpensive iron (steel) substrate protected by such a coating when used as a nickel hydroxide battery electrode exhibited a specific capacity of 0.25 Ah g$^{-1}$ at C/5 discharge rate, comparable to a nickel hydroxide electrode based on a relatively expensive nickel foam substrate. The steel-based electrode also exhibited no noticeable degradation over 150 cycles at C/2 rate. This demonstration of a robust and economical steel substrate presents a unique opportunity for reducing the cost of the nickel electrode in alkaline batteries.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGS. 5A, 5B, 5C, and 5D. (A) XPS survey spectrum, and high resolution spectra of (B) Co $2p_{3/2}$, (C) Fe 2p, and (D) O 1 s.

FIGS. 11A, 11B-1 and 11B-2. (A). Long term cycling of the nickel electrode on LCS-20 at C/2 rate, and (B). a schematic displaying an increase in the LCD capacity, and permanent capacity loss after 150 cycles. Here QLCD and QHCD denote the capacity accessible at low current and high current discharge, respectively.

FIGS. 12A, 12B, and 12C. Photographs of (A) sintered steel wool, (B) iron foam substrates, approximately 25 cm2 in geometric area. (C) capacity of nickel electrode during formation on surface modified (i) sintered steel wool and (ii) iron foam substrates.

DETAILED DESCRIPTION

Figure 1:
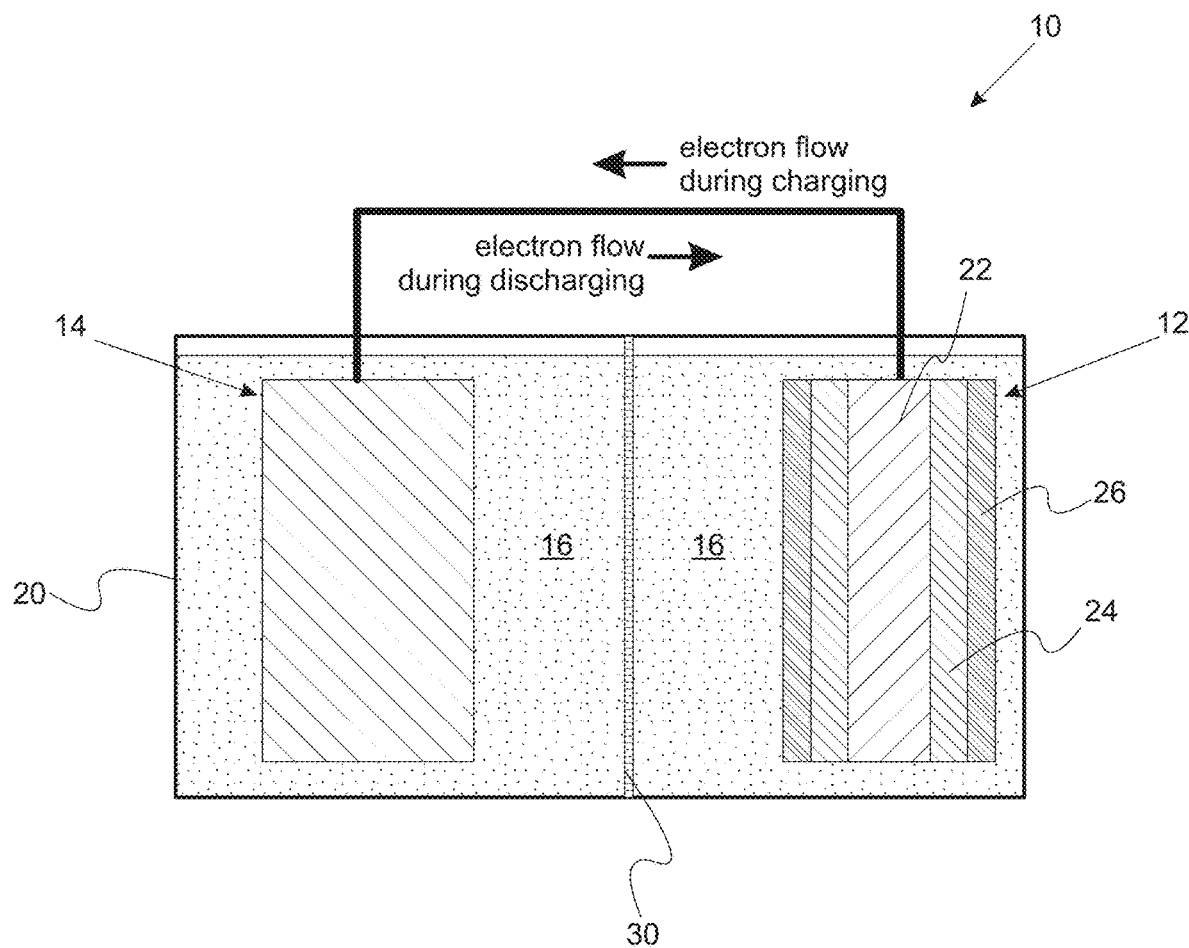
FIG. 1. A schematic of an alkaline battery incorporating the electrode of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

ABBREVIATION

"CS" means cobalt ferrite.
"FIB" means focused-ion beam.
"LCD" means low current density.
"LCS" means lithiated cobalt ferrite.

With reference to FIG. 1, a schematic illustration of an alkaline battering 10 includes positive electrode 12 and negative electrode 14. Electrolyte 16 contacts positive electrode 12 and negative electrode 14. Electrolyte 16 is contained within housing 20 with the electrodes immersed therein. Positive electrode 12 includes an iron-containing substrate 22 (e.g., a mesh, sintered wool, foam, etc.) Cobalt ferrite layer 24 is disposed over the iron-containing substrate 22. Typically, cobalt ferrite layer 24 is composed of cobalt ferrite spinel (e.g., a cobalt ferrite spinel layer). In another refinement, cobalt ferrite layer 24 includes regions of cobalt ferrite spinel. Examples of the iron-containing substrate includes a steel substrate, and more particularly, steel mesh substrate, a sintered steel wool substrate, or a steel foam. Characteristically, the cobalt ferrite layer 24 inhibits corrosion of the iron-containing substrate.

A nickel hydroxide layer 26 is disposed over the cobalt ferrite layer 24. In a variation, the cobalt ferrite layer 24 has a thickness from about 50 to 200 nm. In a refinement, cobalt ferrite layer 24 has a thickness from about 70 to 100 nm. Separator 30 is disposed between the negative electrode and the positive electrode. In a refinement, separator 30 is a microporous separator. In a further refinement, the porous separators are formed from polypropylene (e.g. LDPE, LLDPE, HDPE, UHDPE), polyethylene, and polyolefin, and blends thereof.

In another variation, the cobalt ferrite layer 24 is doped with lithium ions (i.e., $Li^+$) to form a doped cobalt ferrite layer to increase the electrically conductivity compared to an undoped cobalt ferrite layer. Typically, the cobalt ferrite layer 24 includes lithium ions in an amount from about 5 to 40 mole %. In a refinement, cobalt ferrite layer 24 includes at least in increasing order of preference, 0.5 mole %, 1 mole %, 2 mole %, 10 mole %, 15 mole %, 20 mole %, or 25 mole % lithium ions. In a further refinement, cobalt ferrite layer 24 includes at most in increasing order of preference, 60 mole %, 50 mole %, 45 mole %, 40 mole %, 35 mole %, 30 mole %, or 25 mole % lithium ions. Moreover, cobalt ferrite layer 24 has specific capacity of at least 0.15 Ah $g^{-1}$ at C/5 discharge rate. In a refinement, cobalt ferrite layer 24 has specific capacity of from about 0.15 Ah $g^{-1}$ at C/5 discharge rate to about 0.25 Ah $g^{-1}$ at C/5 discharge rate.

In a variation, the cobalt ferrite layer has formula $CoFe_xO_y$ where x is 1.8 to 2.2 and y is 3.6 to 4.4. In some refinements, x is at least, in increasing order of preference, 1.5, 1.6, 1.7, 1.8, 1.9 or 2.0 and at most, in increasing order of preference, 2.3, 2.2, 2.15, 2.1, 2.05, or 2.0. In other refinement, y is at least, in increasing order of preference, 3.5, 3.6, 3.7, 3.8, or 3.9 and at most, in increasing order of preference, 4.5, 4.4, 4.3, 4.2, 4.1, or 4.0. In a refinement, the cobalt ferrite layer has formula $CoFe_2O_4$.

In another variation, the electrolyte is a lithium ion-containing solution. In a refinement, the electrolyte is an aqueous solution of potassium hydroxide solution and lithium hydroxide. In a further refinement, the electrolyte includes 5 to 40 weight percent potassium hydroxide and 0.1 to 10 weight percent lithium hydroxide in water. These weight percentages are with respect the total weight of the electrolyte. In some variation, the electrolyte has a pH greater than in increasing order of preference, 7, 8, 9, 10, 11, 12, 13, or 14.

Additional details of the invention are set forth in Ahamed Irshad et al 2020 J. Electrochem. Soc. 167 020543 and B. Zayat et al., *Inexpensive and robust iron-based electrode substrates for water electrolysis and energy storage*, (www- .sciencedirect.com/science/article/pii/S2451910320301630), Volume 25, February 2021, 100628; the entire disclosures of these documents are hereby incorporated by reference in their entirety.

The following examples illustrate the various embodiments of the present invention. Those skilled in the art will recognize many variations that are within the spirit of the present invention and scope of the claims.

2. Experimental

2.1. Preparation of Surface-Protected Steel Mesh Substrates

Mild steel mesh (mesh size 60, wire diameter 0.0075") with an open area of 31% was used as the substrate. To ensure sufficient porosity, the steel mesh was cut and folded into three layers each having a geometric area of 5 cm×5 cm area with a 4 cm long tab on one side for the external electrical connection. Prior to applying the coating, the steel substrate was degreased by ultrasonication for 15 min in isopropanol. Then the cobalt ferrite coating was applied in two steps:[9]

Step 1: Dipping the substrate in an aqueous solution (with 20% isopropanol-acetone mixture) of 0.1 M $Co(NO_3)_2$ and sonicating for 15 min Step 2: Heating the substrate at 400° C. for 30 min in air to form the cobalt ferrite.

For the incorporation of lithium ions, the required amount of lithium nitrate was directly added to the precursor solution. The cobalt-ferrite-coated steel and lithium-doped cobalt ferrite coated steel samples are denoted as CS and LCS, respectively with the percent of lithium doping indicated by a number. For instance, LCS-20 refers to 20% lithium incorporated in the cobalt ferrite coating.

2.2. Preparation of Nickel Hydroxide Battery Electrodes

An electrode slurry was prepared by mixing of spherical nickel (II) hydroxide (BASF AP-87 Co4), acetylene black, and ethyl cellulose (Ethocel, Standard 45, Dow Chemical Co.) in isopropanol in 80:10:10 (w/w/w) ratio. Ethyl cellulose was first dissolved in isopropanol by sonication to get a 10 wt % solution which was then added to the electrode slurry. Acetylene black was added to enhance the electrical conductivity of the active material mix containing insulating nickel (II) hydroxide active material. The ethyl cellulose served as the binder to connect the active material and carbon particles. After thorough mixing, the electrode slurry was pasted on the surface of the protected steel mesh substrate and dried at 70° C. for 2 h. The coating and drying processes were repeated until the desired loading was achieved. Finally, the electrodes were dried at 70° C. overnight. Typically, the active material loading was 80 mg $cm^{-2}$. For comparison, nickel hydroxide electrodes were also prepared on nickel foam (thickness: 2.2 mm, density: 420 g $cm^{-3}$) using the same pasting and curing procedure described above.

2.3. Electrochemical Measurements

All electrochemical measurements were carried out in a three-electrode polypropylene cell with a mercury/mercuric oxide (MMO) reference electrode (in a 30 wt % potassium hydroxide aqueous solution, $E^{rev}$=0.098 V vs. Normal Hydrogen Electrode, NHE) and nickel-mesh counter electrodes on either side of the working electrode. An aqueous solution of 30 wt % potassium hydroxide solution with 1 wt % lithium hydroxide was used as the electrolyte. We selected this electrolyte composition as it is commonly used in commercial alkaline batteries. The electrochemical stability of the cobalt ferrite coating was tested by anodic polarization at 10 mA $cm^{-2}$ for 1000 h. The current density of 10 mA $cm^{-2}$ corresponded to a C/2 rate in the battery electrode testing and the electrode potential during the stability measurement was close to 0.6 V vs. NHE which also corresponded to the upper limit of the potential of the nickel battery electrode. To study the response of the coated substrate over the potential range of operation of the nickel hydroxide electrode, we carried out cyclic voltammetry measurements at a scan rate of 10 mV $s^{-1}$ over the potential range of 0 to 0.6 V vs. MMO. Electrochemical impedance spectroscopy (EIS) measurements were carried out in the frequency range of 10 kHz to 1 Hz with a sinusoidal voltage excitation of 2 mV. Nickel hydroxide battery electrodes were repeatedly charged and discharged at C/5 rate for 20 cycles to achieve as stable capacity, a process referred to as "formation." To investigate the factors affecting the active material utilization in the battery electrodes, we also performed several experiments on nickel electrodes after formation, by charging and discharging at different values of current.

2.4. Characterization of Surface Structure and Composition

The surface morphology and elemental composition were studied by scanning electron microscopy (SEM) by placing a cut section of the coated substrate on the sample stub (SEM, JSM-7001 with EDX unit). The phase composition and crystallinity of all the samples were investigated by powder X-ray diffraction (XRD, Rigaku Ultima IV diffractometer, Cu K-alpha source). X-ray photoelectron spectroscopy (XPS, Kratos Axis Ultra DLD) was used to investigate the surface composition of the coating. All XPS spectra were calibrated against the C1s internal signal at 284.5 eV. Samples for X-ray diffraction (XRD) and X-ray photoelectron spectroscopy (XPS) studies were prepared in the same way as for the SEM studies. Morphology, thickness, and elemental distribution of the surface films were probed by transmission electron microscopy (TEM). Sub-100 nm thick cross-section of the samples was prepared using standard focused-ion beam techniques (FEI Nova 600 NanoLab DualBeam) and the resulting lamella was imaged using a TEM (JEOL JEM-2100F) at 200 kV. Cobalt K-edge X-ray Absorption Near Edge Spectroscopy (XANES) and Extended X-ray Absorption Fine Structure (EXAFS) studies were carried out at Sector 20-BM beamline in the Advanced Photon Source (Argonne National Laboratory). The incident beam was monochromatized using a pair of Si (111) crystals and focused to a spot of ~500 μm diameter at the sample position using a toroidal focusing mirror. The fluorescence signal was monitored using a multi-element, energy dispersive germanium detector. The leading part of the cobalt Kα signal was selectively windowed to minimize overlap with the iron-Kβ background that also emanates from the sample. Harmonic contamination of the incident beam was suppressed using a rhodium-coated harmonic rejection mirror. A reference cobalt foil was simultaneously measured to ensure energy calibration. The threshold energy (defined using the position of the first inflection point) was taken as 7708.8 eV.[11] The uncertainty in energy between the various samples is estimated to be ±0.05 eV. Measurements of cobalt oxide/hydroxide standards were also carried out. Data reduction followed standard procedures using established software.[12] The samples for XANES were prepared on large steel foil substrates, and the materials were scraped off using a ceramic blade. The samples were then placed in a thick Teflon frame with kapton tape sealing on either side of the frame.

3. Results and Discussion

3.1. Substrate Structure and Phase Composition

Figure 2A:
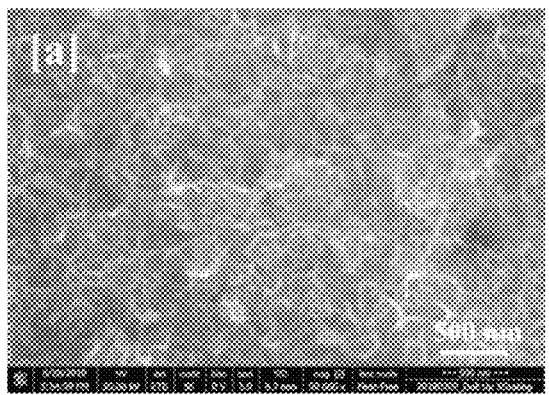
FIGS. 2A, 2B, and 2C. SEM images of the steel substrates after coated with (A). CS, (B). LCS-20, and (C). LCS-50.
Figure 2B:
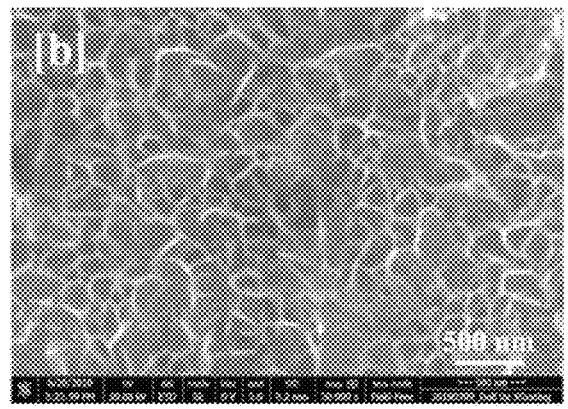
Figure 2C:
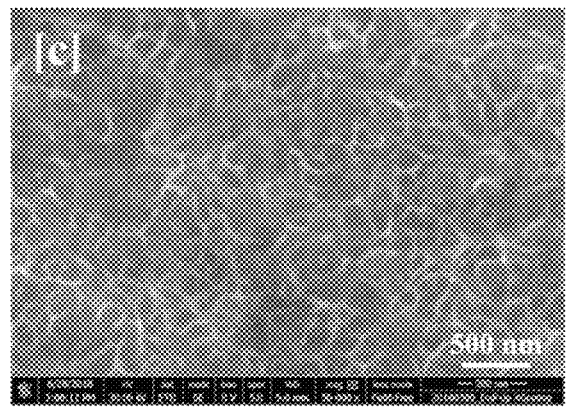

The steel mesh substrate after thermal coating of cobalt ferrite (CS) had numerous randomly-oriented nanometer-sized flake-like structures which appeared to be interconnected to form a dense flake-like structure (FIG. 2A). The interwoven structure created macropores with the size of the pores ranging from 50 to 200 nm. However, we can expect that the bottom section of these individual pores to be covered with cobalt ferrite layer protecting the underlying steel substrate because of reaction of the cobalt nitrate with the iron substrate during coating. In the coating containing 20% lithium (LCS-20), the flake like morphology is retained but with larger pores with pore size in the range of 100-300 nm (FIG. 2B). The flakes are also slightly thicker compared to that in the pristine cobalt ferrite coating. Further increase of lithium content (LCS-50) does not alter the morphology significantly (FIG. 2C). A similar morphology is reported in the literature for sulfur-doped cobalt ferrite nanoparticles.[13]

Figure 3A:
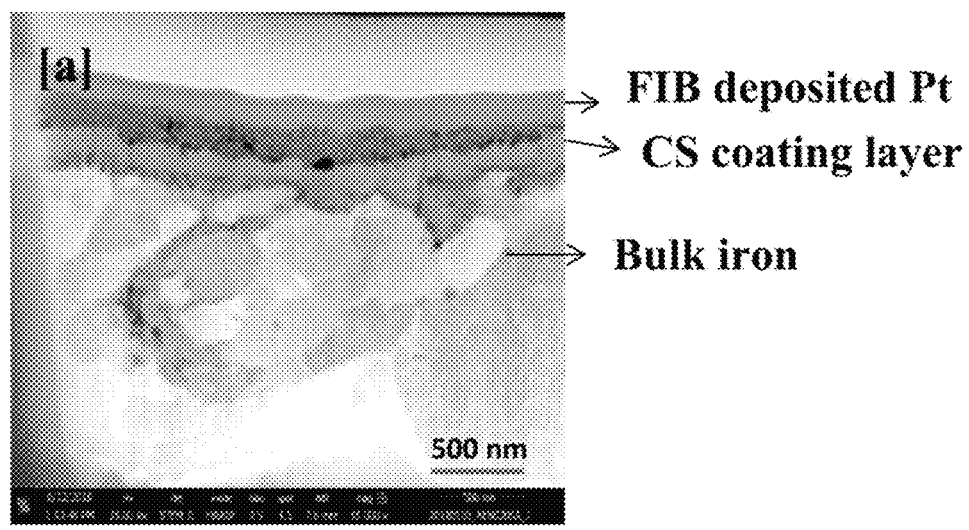
FIGS. 3A, 3B, and 3C. (A) Cross sectional TEM image of CS, and elemental maps for (B). cobalt, and (C). Iron.
Figure 3B:
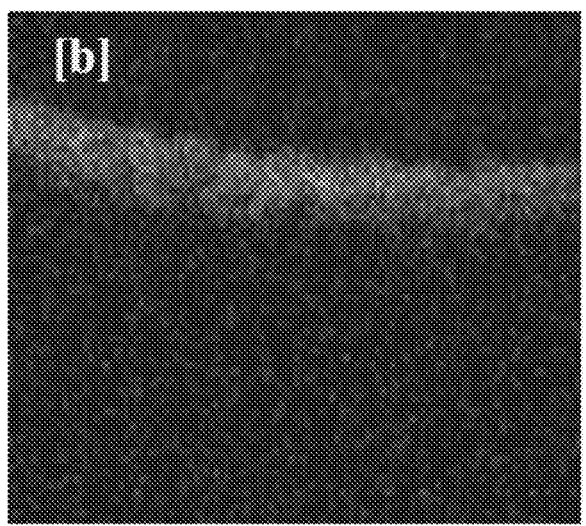
Figure 3C:
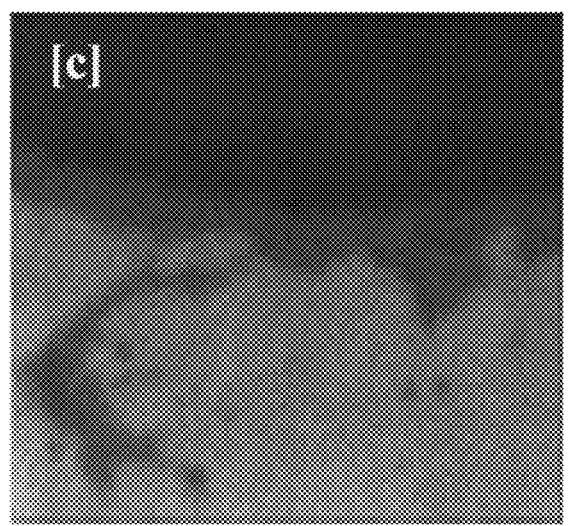

FIG. 3 shows the cross-sectional TEM images of CS along with elemental maps. The topmost layer is from Pt used during the etching of a thin section of the coating. The dense porous middle layer represents the CS coating. Thickness of this layer ranges from 70 to 100 nm. FIGS. 3B and 2c suggest uniform distribution of cobalt and iron throughout the coating. The bulk of the material remains as steel without significant conversion from the heat treatment used for the coating (FIG. 3C). It is anticipated that the growth of the CS layer is self-limiting owing to limited availability of $Co^{2+}$ ions on the surface.

Figure 4A:
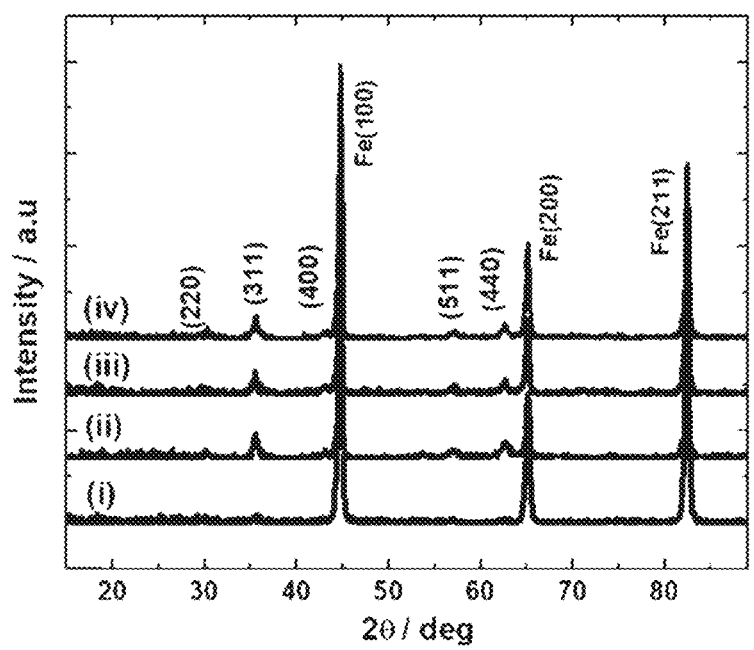
FIGS. 4A and 4B. (A) XRD spectra of (i) bare steel mesh, (ii). CS, (iii). LCS-20, and (iv). LCS-50. (B). Variation in the lattice constant and 2θ position for (311) plane with $Li^+$ content.
Figure 4B:
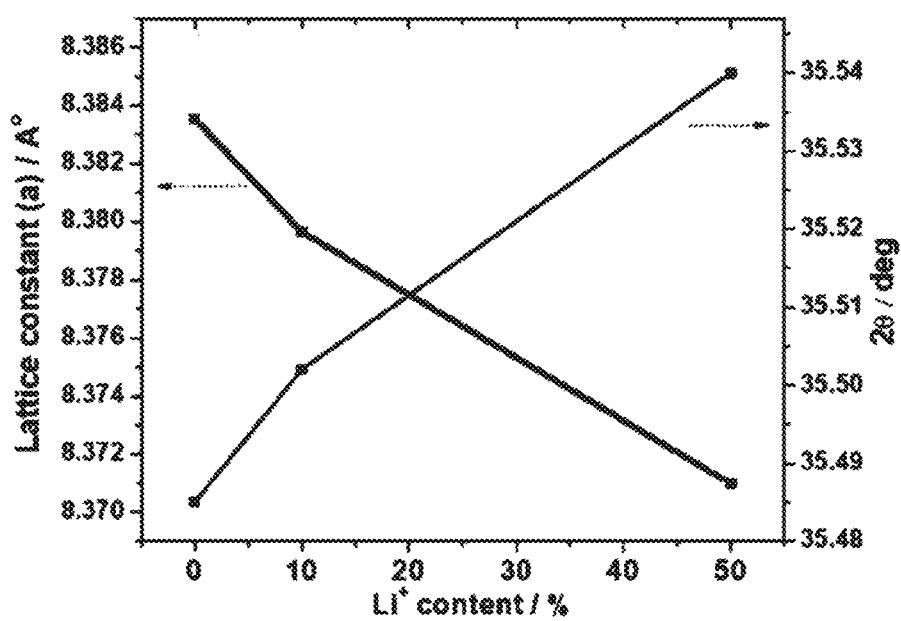

XRD patterns were recorded to identify the phase composition and to probe any change in the lattice parameter resulting from lithium doping. Diffraction peaks at 2-theta values of 45°, 65.1° and 82.3° corresponding to diffraction from (100), (200) and (211) planes of α-iron (FIG. 4A-i) were present in all samples[14] suggesting that the bulk of the substrate remained as steel and the thermal coating was limited to a thin layer on the surface, consistent with the TEM results. In the case of CS, additional peaks appeared at 30.5°, 35.7°, 43.4°, 57.1° and 63° (FIG. 4A-i). These peaks were assigned to (220), (311), (400), (511) and (440) reflections from an FCC phase consistent with the formation of the cobalt ferrite ($CoFe_2O_4$) spinel.[15] No additional impurity reflections were observed suggesting a phase-pure coating. The spinel phase was retained in the case of LCS-20 (FIG. 4A-iii) and LCS-50 (FIG. 4A-iv). However, the peaks were shifted to higher 2-theta values indicating incorporation of lithium ions into the spinel lattice. This observation was consistent with the literature on lithium-doped cobalt ferrite prepared by the sol-gel combustion method.[16] In the present case, Li+ (ionic radius 74 pm) could substitute for the larger $Co^{2+}$ ions (ionic radius 82 pm) leading to a net lattice contraction and shift of diffraction peaks to slightly higher 2-theta values (FIG. 4B). Instead, if Li+ replaced the smaller $Fe^{3+}$ ions (ionic radius 67 pm), lattice swelling would be expected.[17] As discussed in the later sections, the lithium ions play a significant role in increasing the electrical conductivity of the coating.

3.2. Surface Composition

Surface composition and oxidation state of the metal ions in the thermal coating were examined using XPS and XAS. The photoelectron and Auger peaks in the XPS survey spectrum (FIG. 5A) indicate iron, cobalt, lithium and carbon as the major elements present. Thus, other elemental impurities were below the detectable limit. The resolution of the Co 2p peak allows the assignment of oxidation states of cobalt. In general, pure $Co^{3+}$ compounds show a very weak shake-up peak in the Co 2p spectrum, whereas pure $Co^{3+}$ has prominent shake-up peaks that are 4-6 eV higher in binding energy (BE) compared to the main photoelectron signal. If both oxidation states are present, instead of distinct shake-up peaks, a very broad plateau is observed.[18, 19] As it is shown in FIG. 5B, the deconvolution of higher resolution Co $2p_{3/2}$ peak in LCS-20 generates three peaks at 778.5, 779.3 and 780.5 eV which can be assigned to $Co^{2+}$ in the octahedral sites, $Co^{2+}$ in tetrahedral sites and $Co^{3+}$ in octahedral sites.[20] In addition, there is a broad shake-up feature centered around 788 eV similar to that reported in mesoporous $Co_3O_4$.[21] This peak suggests that the surface coating with lithium doping has mixed oxidation states of +2 and +3 for cobalt. Similarly, deconvolution of the Fe 2p core level spectrum suggests two kinds of lattice sites for Fe ions (FIG. 5C). The doublet of Fe $2p_{3/2}$ signal at 709.3 eV and Fe $2p_{1/2}$ peak at 722.6 eV are due to $Fe^{3+}$ in the octahedral sites whereas the doublet of Fe $2p_{3/2}$ binding energies at 711.3 eV and Fe $2p_{1/2}$ binding energies at 724.4 eV are due to $Fe^{2+}$ in the tetrahedral sites.[22] The spectrum exhibits broad and strong satellite characteristic of high spin $Fe^{2+}$ in the octahedral sites. It is likely that the oxidation of $Co^{2+}$ to $Co^{3+}$ is partially compensated by the reduction of $Fe^{3+}$ to $Fe^{2+}$. The peak at 529.1 eV in the O1s spectrum (FIG. 5D) arises from the metal-oxygen bonding in the cobalt ferrite and the peak at 530.6 eV indicates the presence of metal-hydroxide bonding as in M-OH bond (M=Co(II) or Fe(III)).[23]

Figure 6A:
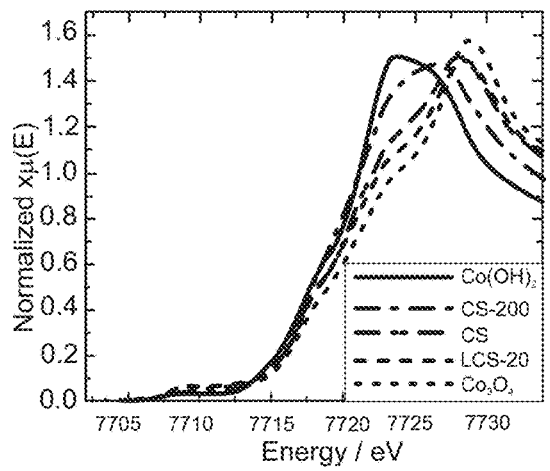
FIGS. 6A, 6B, 6C, 6D, and 6E. Comparison of cobalt in CS-200, CS, and LCS-20 to $Co(OH)_2$ and $Co_3O_4$ standards: (A). Co K-edge XANES, (B). expanded view of the pre-edge peak, (C). $k^2$-weighted EXAFS, and corresponding (D). magnitude and (E). real part of the Fourier transform.
Figure 6B:
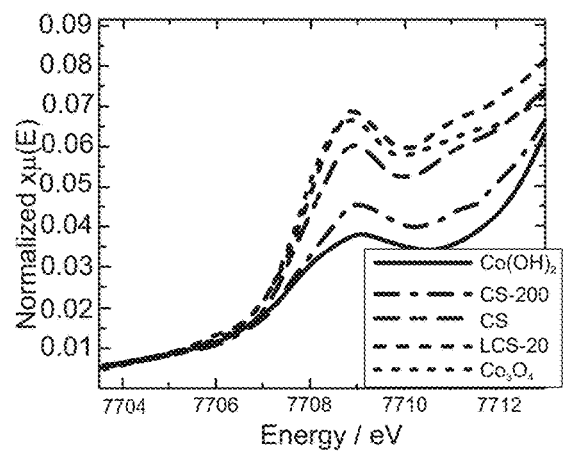

FIG. 6A shows the XANES of the samples compared with β-$Co(OH)_2$ and spinel $Co_3O_4$ standards. An expanded view of the pre-edge is shown in FIG. 6B. In β-$Co(OH)_2$, Co is octahedrally coordinated as $Co(II)O_6$. The edge-position of this standard is lowest among the curves displayed in FIG. 6A. Also, due to the presence of a fairly symmetric octahedra, the pre-edge peak at ~7709 eV has relatively small intensity. The XANES of spinel $Co_3O_4$ has contribution from both tetrahedral $Co(II)O_4$ and octahedral $Co(III)O_6$. The edge-position is highest among the samples shown in FIG. 6A due to the higher average oxidation state and the pre-edge peak at ~7709 eV has significant intensity due to the presence of tetrahedral Co ions. Further, there is a broad feature at ~7711 eV in the spectra of $Co_3O_4$, which is typically attributed to non-local interactions in cobalt oxides.[24] The pre-edge of CS-200 sample (i.e., CS sample prepared at 200° C.) exhibits slightly enhanced intensity relative to β-$Co(OH)_2$, but is significantly lower than that seen for $Co_3O_4$. This suggests that a majority of the Co in CS-200 is present in octahedral environments, although a minority fraction is tetrahedrally coordinated also. In addition, there is a weak but clear feature at ~7711 eV, similar to that seen for $Co_3O_4$. The pre-edge intensity of the CS sample is larger than CS-200 but slightly lower than $Co_3O_4$ or LCS-20. The edge shape and position of the CS and LCS-20 samples start resembling $Co_3O_4$, with the LCS-20 being most close to $Co_3O_4$. The general appearance of the XANES of CS and LCS-20 samples, gradually transitions in shape form that seen for CS-200 to that of $Co_3O_4$.

Figure 6C:
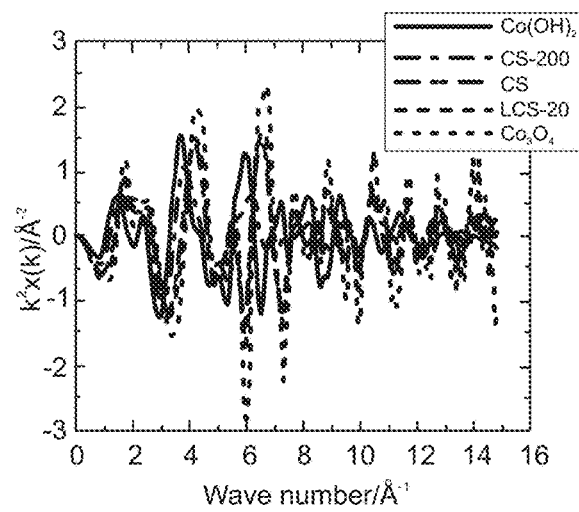
Figure 6D:
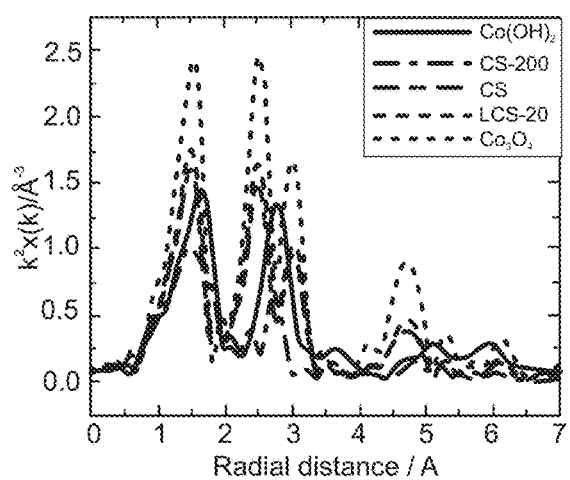
Figure 6E:
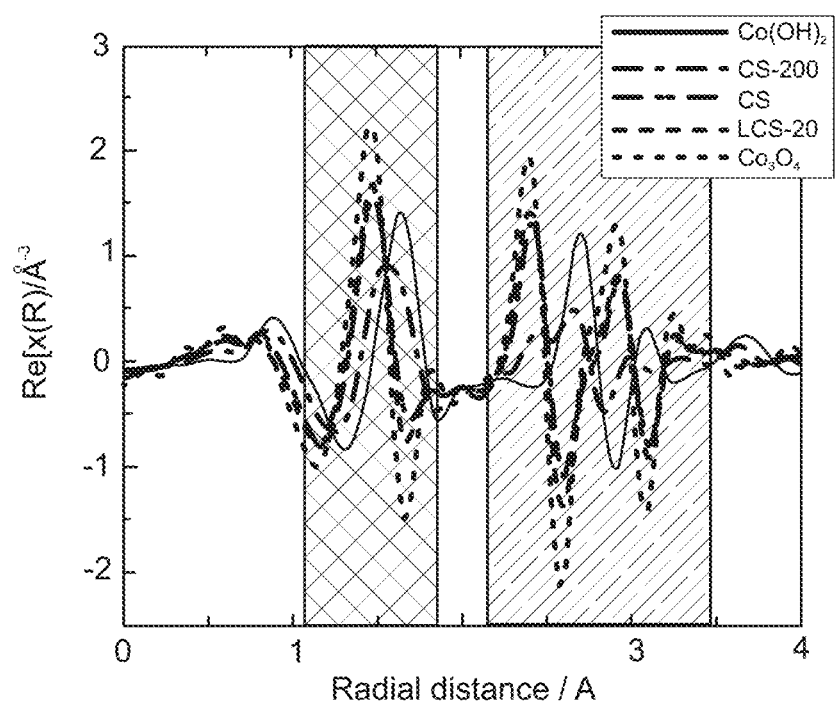

The raw EXAFS $\chi(k)$ spectra and both the amplitude and real part of the corresponding Fourier transforms (FTs) are shown in FIGS. 6C-E. A cursory inspection shows that the major correlations present in $Co_3O_4$ is also present in the CS and LCS-20 samples. This is contrast to CS-200 sample, which has only some features similar to $Co_3O_4$. To help identify potential correlations present in the samples, selected regions are highlighted in real part of the FTs. The Co—O bonds (from both octahedral and tetrahedral Co sites) contribute to the region highlighted in grey. The Co-metal correlations contribute to the region highlighted in red. It is clear that a majority of the cobalt in the CS (and LCS-20) sample has environments similar to $Co_3O_4$. However, the amplitude of the correlations does not reach that of $Co_3O_4$. In contrast, the features of CS-200 have components that are present both in $Co(OH)_2$ and $Co_3O_4$; therefore, the cobalt atoms in CS-200 have environments similar to that seen in both $Co(OH)_2$ and $Co_3O_4$. Taken in toto, the XANES and EXAFS observations suggest: (a) the CS-200 sample has cobalt occupying both octahedral and tetrahedral sites. A large fraction of the cobalt is present as $Co^{2+}$ in octahedral sites (akin to Co in $Co(OH)_2$). There is also evidence that a small fraction of cobalt atoms have environments similar to that present in $Co_3O_4$, including the presence of tetrahedrally coordinated cobalt, and (b) In CS and LCS-20, the majority of the Co is in a form similar to $Co_3O_4$, indicating that both $Co^{2+}$ in tetrahedral sites as well as $Co^{3+}$ in octahedral sites are present. Heating treatment at 400° C. converts much of the $Co(OH)_2$ like environments present in CS-200 to a spinel-like environment. The lithium doped sample has a slightly enhanced spinel-like environment compared to CS and potentially has the least amount of $Co^{2+}$ in $Co(OH)_2$-like, octahedral environments.

3.3. Electrochemical Measurements

Durability Test for the CS Substrate

Figure 7:
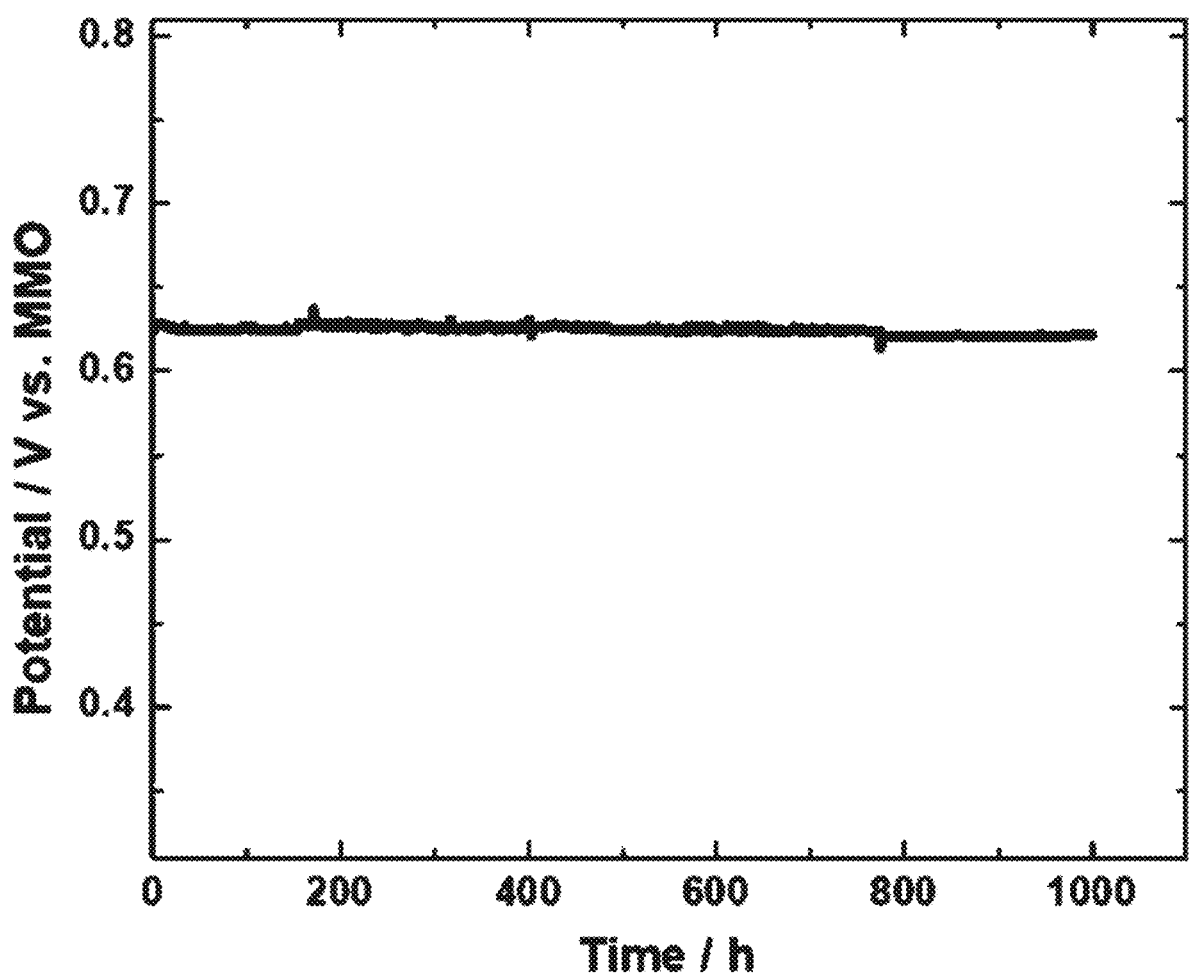
FIG. 7. Durability test for the CS substrate for 1000 h at 10 mA $cm^{-2}$ in 30% KOH solution.

To be a viable substrate in commercial batteries, the surface protected steel should exhibit outstanding durability over thousands of hours. To test the robustness of our CS coated electrode we conducted galvanostatic anodic polarization at 10 mA cm$^{-2}$ in 30% KOH solution and monitored the electrode potential for 1000 hours. The use of a single compartment cell avoided any pH change, and the loss of water was compensated by periodic addition of de-ionized water. Also the reference electrode was checked periodically for any drift in its potential. The extremely low rate of change of potential of 1.5 μVh$^{-1}$ (FIG. 7) confirmed that the substrate was stable during the 1000 hours of testing. This stability is in sharp contrast to the rapid disintegration and brown coloration of the solution observed when the bare (unprotected) steel mesh was subjected to a similar test.

Formation of Nickel Hydroxide Electrode Based on a CS-Coated Substrate

Figure 8A:
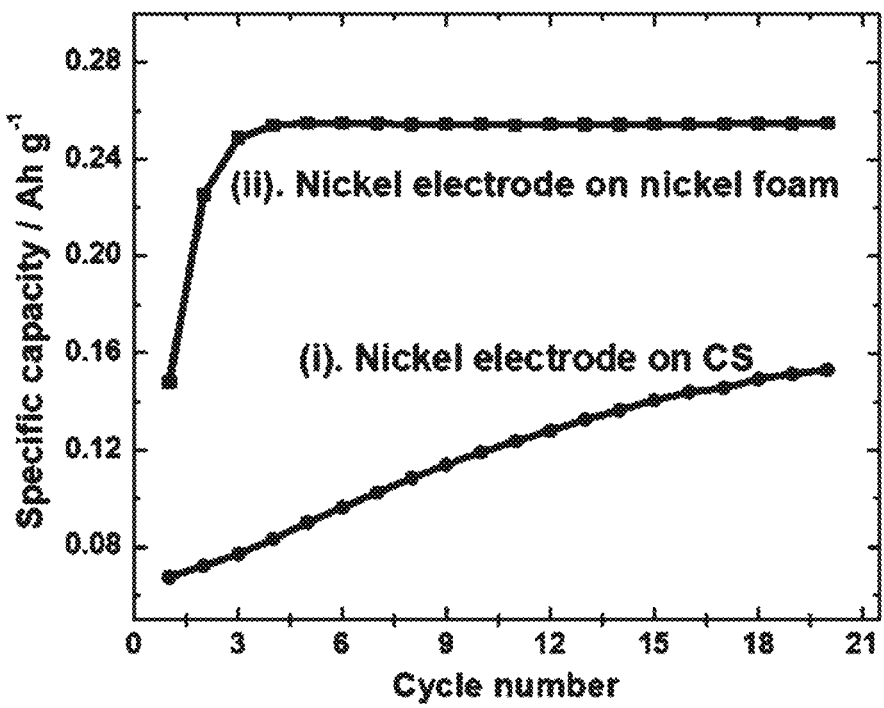
FIGS. 8A and 8B. (A). Formation cycles, and (B). charge and discharge curves at the end of formation for the nickel electrodes on (i). CS substrate and (ii). nickel foam.
Figure 8B:
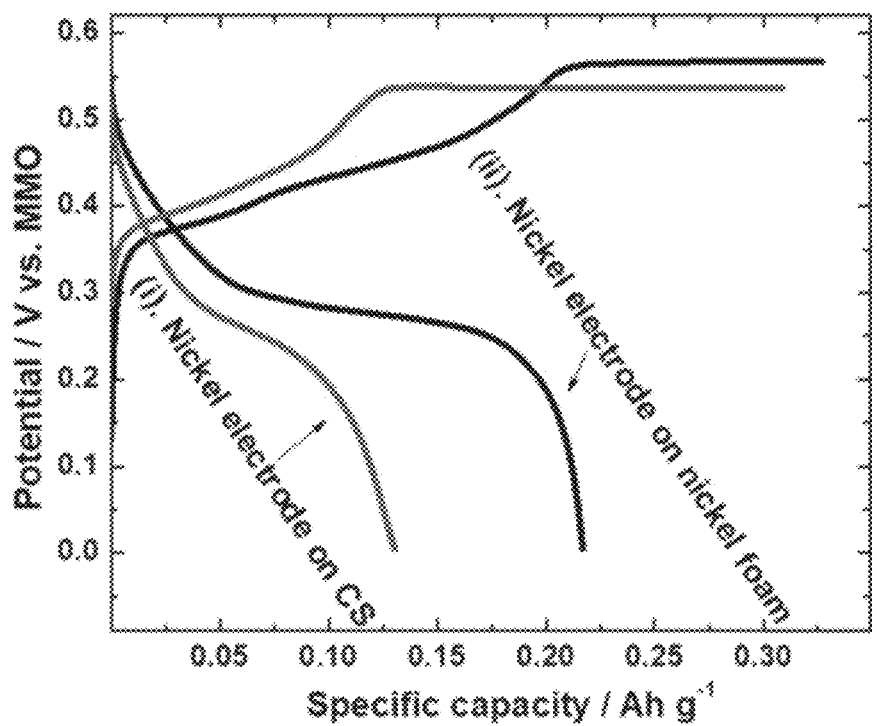

The nickel hydroxide electrode using a CS-coated substrate was "formed" by repeated galvanostatic cycling at C/5 charge and discharge rates. During the formation step, utilization of the electrode increases gradually with the number of cycles and reaches a maximum in 20 cycles (FIG. 8A curve (i)). The specific capacity at the end of the 20$^{th}$ cycle was 0.153 Ah g$^{-1}$ which was only 53% of the theoretical capacity. To rule out the possibility that the slurry coating process limited the utilization, we prepared nickel hydroxide electrode on nickel foam using the same slurry coating process and tested the electrode under identical conditions. The nickel foam-based electrode underwent formation and reached its maximum capacity in 3-4 cycles (FIG. 8A curve (ii)). Furthermore, the end of formation (EOF) capacity was 0.255 Ah g$^{-1}$ (88% of the theoretical capacity), and it was 0.102 Ah g$^{-1}$ higher than that in the case of the nickel electrode on the CS substrate. This undoubtedly indicated that the active material utilization was being limited by the CS substrate. The CS-based electrode exhibited a higher overpotential compared to the nickel foam electrode during both charge and discharge (FIG. 8B). This higher overpotential was attributed to poor electronic conductivity of the semiconducting CS coating layer compared to metallic nickel (vide infra).

Figure 9A:
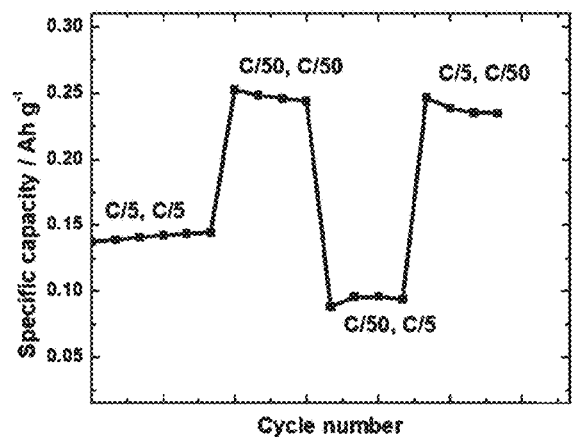
FIGS. 9A, 9B, and 9C. (A). Rate capability test for the nickel electrode on CS substrate. Here C/m, C/n denotes charging at C/m and discharging at C/n rates, respectively. (B) Cyclic voltammograms of CS in 30% KOH electrolyte at 1 mV $s^{-1}$ and (C). charge and discharge curves of the nickel electrode on CS at C/5, C/5.

We suspected that the effect of the CS substrate on the utilization of the nickel electrode could be different during charge and discharge. So we studied the utilization of nickel hydroxide electrode using four protocols of charge and discharge at different rates: (i). Charging and discharging at C/5, (ii). Charging and discharging at C/50, (iii). Charging at C/50 and discharging at C/5, and (iv). Charging at C/5 and discharging at C/50. These four types of measurements paved the way to isolate the asymmetric effect of charging and discharging rate on the utilization of active materials. When both charge and discharge rates were C/5, poor utilization close to 0.150 Ah g$^{-1}$ was obtained (FIG. 9A). In contrast, a high utilization of 0.253 Ah g$^{-1}$ was observed when both charge and discharge rates were low at C/50. However, only reducing the charge rate to C/50 while maintaining a high discharge rate at C/5 didn't result in high specific capacity indicating that the utilization was limited by the poor discharge rate capability. The measurements at low discharge rate (C/50) and high charge rate (C/5) however showed that despite the high rate for charging, specific capacity as high as 0.250 Ah g$^{-1}$ was obtained when discharged at C/50. These four types of measurements proved that the utilization was largely limited by the poor discharge rate capability of the nickel electrode with the CS substrate. Since the CS substrate selectively hindered the discharge process without affecting the charging process, we hypothesized that the substrate may be existing in two different chemical forms with different electrical conductivity values during charge and discharge of the electrode.

Figure 9B:
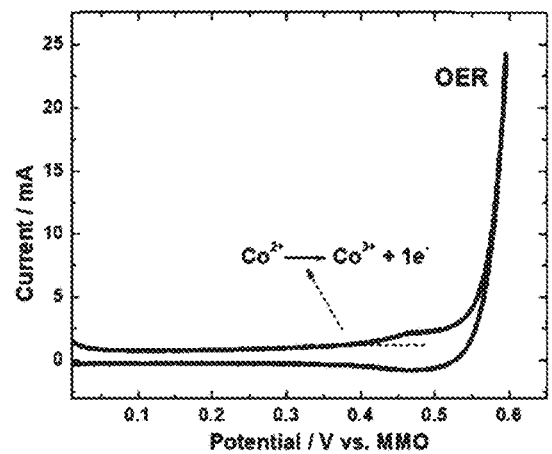
Figure 9C:
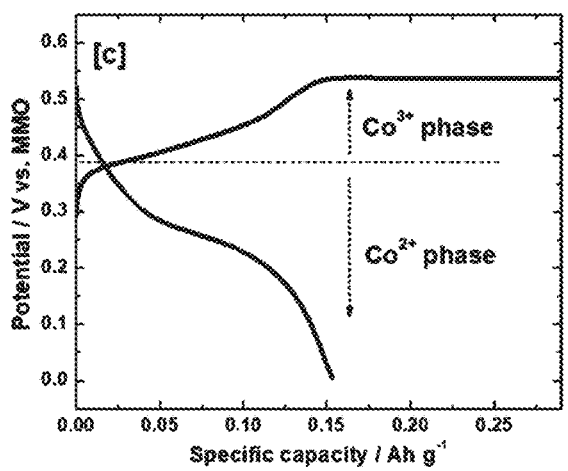

To study the potential-dependent dynamic change in the conductivity of the CS substrate, cyclic voltammograms were recorded for the substrate in the potential window of the nickel hydroxide electrode. As it is seen from FIG. 9B, the CS electrode undergoes oxidative transformation from $Co^{2+}$ to $Co^{3+}$ near 0.40 V during the anodic sweep. This peak is reversed and $Co^{3+}$ reduces back to $Co^{2+}$ during the cathodic sweep. It is reported that the compounds with cobalt in +3 oxidation state such as CoOOH are electronically more conducting than $Co^{2+}$ compounds such as $Co(OH)_2$.[25] Hence it is anticipated that CS substrate will be more conducting at a potential above 0.40 V. Interestingly, the potential during charging of the nickel hydroxide electrode is above 0.40 V whereas the potential during discharge falls below 0.40 V (FIG. 9C). Thus the CS substrate is expected to return to the less conducting $Co^{2+}$-rich phase during the discharge process resulting in poor discharge rate capability of the nickel hydroxide electrode based on the CS substrate. Thus, during charge, the substrate existed in a highly conducting $Co^{3+}$-rich phase allowing the electrode to be charged at higher rates without any significant reduction of utilization.

Effect of Doping on Rate Capability

We had attributed the lower utilization of the electrodes with the CS substrate to the active change in the electronic conductivity from the $Co^{2+/3+}$ redox process. Since $Co^{3+}$ improved the conductivity and favored charging, we hypothesized that substitutional-doping of monovalent ions such as $Li^+$ for $Co^{2+}$ in $Co^2 Fe_2O_4$ would result in increase in the fraction of $Co^3$ ions in the coating, leading to a stoichiometry of $Li^+_x Co^{2+}_{1-2x} Co^{3+}_x Fe_2O_4$, where x was the level of doping. As is evident from XRD (FIG. 4) addition of $LiNO_3$ to the $Co(NO_3)_2$ solution bath during the coating process and subsequent annealing results in $Li^+$ doping. XPS of Co 2p is consistent with the XANES data on lithium doping induced the increase of $Co^{3+}$ in the coating layer (FIGS. 5 and 6).

Figure 10A:
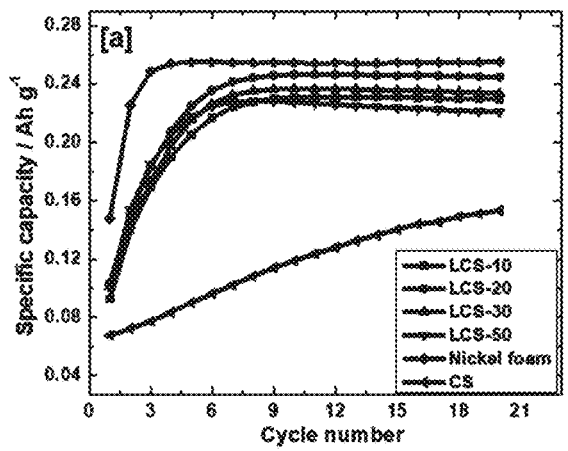
FIGS. 10A, 10B, 10C, and 10D. (A). Nickel electrode formation on different substrates, (B). variation in the EOF capacity as a function of $Li^+$ doping level, (C). charge and discharge curves at the end of formation, and (D). Nyquist plots for the nickel electrodes on (i) nickel foam, (ii). CS and (iii). LCS-20 in the discharged state.
Figure 10B:
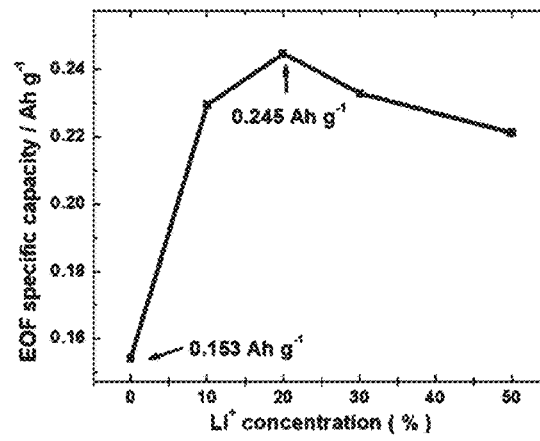
Figure 10C:
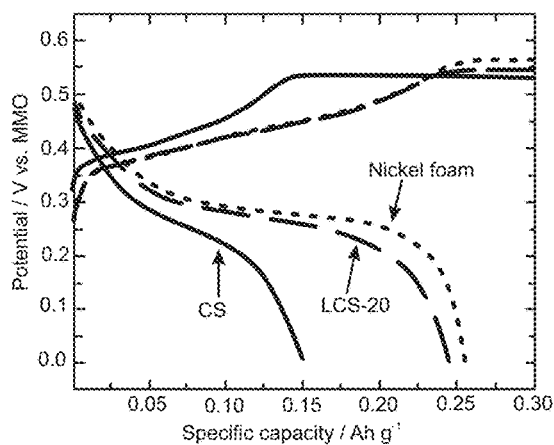
Figure 10D:
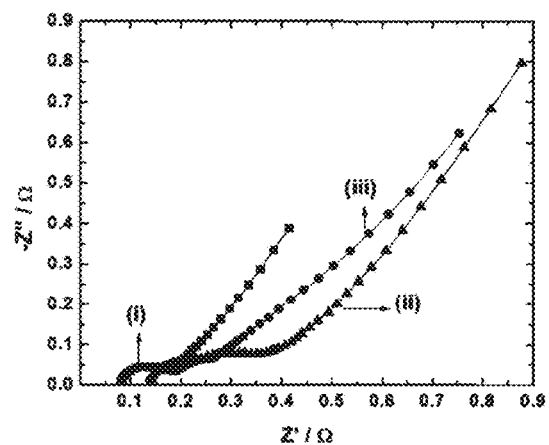

We prepared nickel hydroxide electrodes on steel substrates coated substrates with CS of different lithium doping levels (LCS-10, LCS-20, etc.) and compared their performance with electrodes made with just the CS coating. To focus on the effect of lithium doping on the performance, we discharged and charged at high rates of C/5. The nickel hydroxide electrodes prepared with substrates that included lithium as a dopant underwent formation in fewer cycles compared to the electrodes with the undoped substrate (FIG. 10A). The capacity at the end-of-formation (EOF) exceeded 0.22 Ah $g^{-1}$ for all the electrodes with lithium-doped CS substrates (FIG. 10B). The highest value of EOF capacity was 0.245 Ah $g^{-1}$ with the 20% $Li^+$ dopant, close to 0.255 Ah $g^{-1}$ observed with the nickel foam substrate. The remarkable difference in performance of the nickel hydroxide electrodes using the $Li^+$ doped substrates even at high discharge rates confirm the benefit of increased conductivity of the coating resulting from the increase of $Co^{3+}$ ions in the coating. The benefit is also clear in the low polarization levels observed during charge and discharge curves of the nickel hydroxide electrode when the substrates are coated with the $Li^+$ doped spinel (FIG. 10C). Nyquist plots in FIG. 10D show lower ohmic resistance (as measured from the real component of the impedance at 10 kHz) for the nickel electrode with the LCS-20 substrate (130 mΩ) compared to that on CS (190 mil), indicative of improved conductivity after lithium doping.

Long Term Cycling of the Nickel Electrode on LCS-20

After the initial formation step, nickel electrode on LCS-20 substrate was cycled at C/2 charge and discharge rates. The electrode lost 1.3% of the initial capacity in 150 cycles corresponding to about 300 hours of charge and 300 hours of discharge (FIG. 11A). We were able to attribute this loss in capacity to processes that did not involve the substrate. Part of this capacity loss is due to shedding of the active materials from the electrode that is unavoidable with pasted type electrodes in a cell with excess (flooded) liquid electrolyte. We quantified the amount of the shed materials and found that the permanent loss in capacity comes merely from the shedding process. Some of the shedding arises from the overcharge of the nickel electrode. In general, the starting material β-Ni(OH)$_2$ undergoes oxidation during charging to produce β-NiOOH. However, overcharging of the electrode also produces γ-NiOOH which results in volume expansion and particles breaking.[26-28] The process of expansion/contraction occurs in every cycle, and eventually the loosely bound particles detach from the electrode surface. The shedding of active material is also accelerated by vigorous oxygen evolution at the end of charging process.[29] The remaining loss is attributed to the formation of material that cannot be discharged at the same high rates. There was about 7% loss in the first cycle from such material that cannot be discharged at a high rate. However, this fraction was found to increase to 10% after 150 cycles (FIG. 11B schematics). However, this capacity could be recovered by discharging at a lower rate and not considered a permanent loss. Since, this fraction of the capacity loss is recovered by discharging at a low current (LCD), it can be considered as a reversible loss. Thus, cycling tests suggested that the nickel hydroxide electrode fabricated with a steel current collector protected by the LCS-20 was stable for at least 150 cycles over a 600-h period of charge and discharge.

Studies on Alternate Iron-Based Substrates

The surface modification protocol developed here is a general strategy for protecting iron based substrates from anodic corrosion in alkali, and not restricted to the steel mesh alone. Specifically, we have found that the thermal coating is feasible with 3D current collectors such as sintered steel wool and iron foam (FIGS. 12A and 12B). The sintered steel wool substrate was prepared by treating steel wool (Homax, extra fine grade #0000, 200 g m$^-$2) at 950° C. for 1 h under flowing argon atmosphere. The iron foam (American elements, 99.5% iron) was used as procured, after degreasing with acetone. These substrates were modified with the spinel coating as in the case of the steel mesh electrodes. The nickel battery electrodes with the surface-protected steel wool and iron foam substrates could be prepared and formed to the capacity of 0.162 Ah $g^{-1}$ and 0.212 Ah $g^{-1}$, respectively, (FIG. 12C) in much the same way as the steel mesh substrates. While we did not strive to optimize the performance of these electrodes, the results demonstrated the viability of this cobalt spinel-based coating to modifying various types of iron-based porous current collectors that are used in the battery industry.

4. Conclusions

We have developed a thermal coating to protect iron-based substrates for the nickel hydroxide battery electrode. The coating protected the iron substrate from corrosion in alkali. The coating was a thin (70-100 nm) cobalt ferrite layer obtained by the thermal decomposition of cobalt nitrate on the surface of steel mesh. The surface-protected steel exhibited outstanding stability for 1000 h at 10 mA cm$^-$2 in 30% potassium hydroxide solution. This level of stability was in contrast to rapid disintegration observed for the bare steel under similar conditions. Although the cobalt ferrite coating was protective, its electrical conductivity needed to be higher to achieve good utilization of the nickel hydroxide electrode. Specifically, the cobalt ferrite coated steel mesh impeded discharge whereas it was able to support high rate charge. We attributed this anomalous phenomenon to the potential dependent variation in the electrical conductivity of the cobalt ferrite owing to $Co^{3+/2+}$ redox process around 0.4 V vs. MMO that allowed $Co^{3+}$ to be present during charge but only $Co^{2+}$ upon discharge. We were able to increase the conductivity of the coating during discharge by incorporating $Li^+$ ions to cobalt ferrite lattice. XPS and XAS studies confirmed that the conductivity enhancement by lithium doping was due to the increase in the fraction of $Co^{3+}$ in the spinel structure. The nickel hydroxide electrode based on lithium-doped cobalt ferrite coated steel mesh provided specific capacity of 0.25 Ah $g^{-1}$ at C/5 discharge rate which was comparable to the utilization obtained for the nickel foam based electrode. The nickel hydroxide electrode based on the modified steel substrate also exhibited good cycle life over 150 cycles at C/2 rates. Development of robust and cost-effective surface-protected steel substrates provides a unique opportunity to reduce the cost of positive electrodes in alkaline batteries.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES (1). J. Chen, D. H. Bradhurst, S. X. Dou, and H. K. Liu, *J. Electrochem. Soc.,* 146, 3606 (1999).

(2). S. N. Begum, V. S. Muralidharan, and C. A. Basha, *Int. J. Hydrog. Energy,* 34, 1548 (2009).

(3). P. Periasamy, B. R. Babu, and S. V. Iyer, *J. Power Sources,* 62, 9 (1996).

(4). W. H. Zhu, D. J. Zhang, G. D. Xhang, and J. J. Ke, *Mater. Res. Bull.,* 30, 1133 (1995).

(5). H. Fukunaga, M. Kishimi, N. Igarashi, T. Ozaki, and T. Sakai, *J. Electrochem. Soc.,* 152, A42 (2005).

(6). B. Beverskog, and I. Puigdomenech, *Corros. Sci.,* 38, 212 (1996).

(7). L. Mirkova, G. Maurin, M. Money, and Chr. Tsvetkova, *J. Appl. Electrochem.,* 33, 93 (2003).

(8). C. A. Loto, *Silicon,* 8, 177 (2016).

(9). D. Mitra, P. Trinh, S. Malkhandi, M. Mecklenburg, S. M. Heald, M. Balasubramanian, and S. R. Narayanan, *J. Electrochem. Soc.,* 165, F392 (2018).

(10). D. Mitra, A. Irshad, S. R. Aravamuthan, and S. R. Narayanan, *ECS Meeting Abstracts,* 1691-1691(2018).

(11). S. Kraft, J. Stümpel, P. Becker, and U. Kuetgens, *Rev. Sci. Instrum.,* 67, 681 (1996).

(12). B. Ravel, and M. Newville, *J. Synchrotron Radiat.,* 12, 537 (2005).

(13). D. Cao, X. Wang, L. Pan, H. Li, P. Jing, J. Wangab and Q. Liu, *J. Mater. Chem C,* 4, 951 (2016).

(14). A. Irshad, and N. Munichandraiah, *RSC Adv.,* 7, 21430 (2017).

(15). R. H. Kadam, S. T. Alone, M. L. Mane, A. R. Biradar, and S. E. Shirsath, *J. Magn. Magn. Mater.,* 355, 70 (2014).

(16). M. K. Shobana, *J. Phys. Chem. Solids,* 73, 1040 (2012).

(17). R. H. Kadam, S. T. Alone, M. L. Mane, A. R. Biradar, and S. E. Shirsath, *J. Magn. Magn. Mater.,* 355, 70 (2014).

(18). D. Gu, C. J. Jia, C. Weidenthaler, H. J. Bongard, B. Spliethoff, W. Schmidt, and F. Schuth, *J. Am. Chem. Soc.,* 137, 11407 (2015).

(19). P. Li, R. Ma, Y. Zhou, Y. Chen, Z. Zhou, G. Liu, Q. Liu, G. Peng, Z. Liang, and J. Wang, *J. Mater. Chem. A,* 3, 15598 (2015).

(20). Z. Zhou, Y. Zhang, Z. Wang, W. Wei, W. Tang, J. Shi, and R. Xiong, *Appl. Surf. Sci.,* 254, 6972 (2008).

(21). K. Zhu, C. Jin, Z. Klencsar, A. S. Ganeshraja, and J. Wang, *Catalysts,* 7, 138 (2017).

(22). T. Aghavnian, J. B. Moussy, D. Stanescu, R. Belkhou, N. Jedrecy, H. Magnan, P. Ohresser, M. A. Arriod, Ph. Sainctavit, and A. Barbier, *J. Electron Spectrosc. Relat. Phenom.,* 202, 16 (2015).

(23). J. L. O. Quinonez, U. Pal, and M. S. Villanueva, *ACS Omega,* 3, 14986 (2018).

(24). F. Grootl, G. Vanko, and P. Glatzel, *J. Condens. Matter Phys.,* 21, 104207 (2009).

(25). V. Pralong, A. D. Vidal, B. Beaudoin, J. B. Leriche, and J. M. Tarascon, *J. Electrochem. Soc.,* 147, 1306 (2000).

(26). P. Oliva, J. Leonardi, J. F. Laurent, C. Delmas, J. J. Braconnier, M. Figlarz, F. Fievet, and A. deGuibert, *J. Power Sources,* 8, 229 (1982).

(27). K. H. Young, and S. Yasuoka, *Batteries,* 2, 3 (2016).

(28). J. Chen, D. H. Bradhurst, S. X. Dou, and H. K. Liu, *J. Mater. Res.,* 14, 1916 (1999).

(29). D. A. Corrigan, *J. Electrochem. Soc.,* 134, 377 (1987).

What is claimed is:

1. An electrode for a battery, the electrode comprising:
   an iron-containing substrate;
   a cobalt ferrite layer disposed over the iron-containing substrate, the cobalt ferrite layer inhibiting corrosion of the iron-containing substrate; and
   a nickel hydroxide layer disposed over the cobalt ferrite layer.

2. The electrode of claim 1 wherein the cobalt ferrite layer is a cobalt ferrite spinel layer.

3. The electrode of claim 1, wherein the cobalt ferrite layer is doped with lithium ions to form a doped cobalt ferrite layer to increase the electrically conductivity compared to an undoped cobalt ferrite layer.

4. The electrode of claim 3, wherein the doped cobalt ferrite layer includes lithium ions in an amount from about 5 to 40 mole %.

5. The electrode of claim 3 wherein the cobalt ferrite layer has specific capacity of at least 0.15 Ah $g^{-1}$ at C/5 discharge rate.

6. The electrode of claim 1 wherein the iron-containing substrate is a mesh, sintered wool, or foam.

7. The electrode of claim 1, wherein the cobalt ferrite layer has a thickness from about 50 to 200 nm.

8. The electrode of claim 1, wherein the cobalt ferrite layer has a thickness from about 70 to 100 nm.

9. The electrode of claim 1, wherein the cobalt ferrite layer has formula $CoFe_xO_y$ where x is 1.8 to 2.2 and y is 3.6 to 4.4.

10. The electrode of claim 1, wherein the cobalt ferrite layer has formula $CoFe_2O_4$.

11. The electrode of claim 1, wherein the iron-containing substrate is a steel substrate.

12. The electrode of claim 11, wherein the iron-containing substrate is a steel mesh substrate.

13. The electrode of claim 1, wherein the electrode is a positive electrode in an alkaline battery.

14. An alkaline battery comprising:
   a negative electrode;
   a positive electrode comprising:
      an iron-containing substrate;
      a cobalt ferrite layer disposed over the iron-containing substrate, the cobalt ferrite layer inhibiting corrosion of the iron-containing substrate; and
      a nickel hydroxide layer disposed over the cobalt ferrite layer; and an electrolyte contacting the positive electrode and the negative electrode.

15. The alkaline battery of claim 14 wherein the cobalt ferrite layer is a cobalt ferrite spinel layer.

16. The alkaline battery of claim 14, wherein the cobalt ferrite layer is doped with lithium ions to form a doped cobalt ferrite layer to increase the electrical conductivity compared to an undoped cobalt ferrite layer.

17. The alkaline battery of claim 16, wherein the doped cobalt ferrite layer includes lithium ions in an amount from about 5 to 40 mole %.

18. The alkaline battery of claim 14 wherein the iron-containing substrate is a mesh, sintered wool, or foam.

19. The alkaline battery of claim 14, wherein the cobalt ferrite layer has a thickness from about 50 to 200 nm.

20. The alkaline battery of claim 14, wherein the cobalt ferrite layer has a thickness from about 70 to 100 nm.

21. The alkaline battery of claim 14, wherein the cobalt ferrite layer has formula $CoFe_xO_y$, where x is 1.8 to 2.2 and y is 3.6 to 4.4.

22. The alkaline battery of claim 14, wherein the cobalt ferrite layer has formula $COFe_2O_4$.

23. The alkaline battery of claim 14, wherein the iron-containing substrate is a steel substrate.

24. The alkaline battery of claim 23, wherein the iron-containing substrate is a steel mesh substrate.

25. The alkaline battery of claim 24, wherein the electrolyte is a lithium ion-containing solution.

26. The alkaline battery of claim 14, further comprising a separator disposed between the negative electrode and the positive electrode.

* * * * *